United States Patent [19]

Nihonmatsu

[11] 4,168,437
[45] Sep. 18, 1979

[54] OPTOELECTRIC MULTI-SENSOR MEASURING APPARATUS AND A METHOD FOR MEASURING SURFACE FLATNESS THEREWITH

[75] Inventor: Takashi Nihonmatsu, Nagano, Japan

[73] Assignees: Nagano Electronics Industrial Co., Ltd.; Nidek Co., Ltd., both of Japan

[21] Appl. No.: 832,833

[22] Filed: Sep. 13, 1977

[30] Foreign Application Priority Data

Sep. 13, 1976 [JP] Japan ................................ 51-109605

[51] Int. Cl.² .......................................... G01N 21/30
[52] U.S. Cl. ........................................ 250/560; 356/1
[58] Field of Search ............... 356/1, 4, 120; 290/560, 290/561, 209

[56] References Cited

U.S. PATENT DOCUMENTS

| | | | |
|---|---|---|---|
| 3,667,846 | 6/1972 | Nater et al. | 356/120 |
| 3,671,126 | 6/1972 | Erb | 356/1 |
| 3,817,619 | 6/1974 | Kawahara | 356/1 |
| 3,897,156 | 7/1976 | Chasson | 250/560 |

Primary Examiner—David C. Nelms
Attorney, Agent, or Firm—McGlew and Tuttle

[57] ABSTRACT

The method for efficiently measuring the thickness or surface flatness of, for example, a high-purity silicon semiconductor wafer uses a table to mount the wafer and a plurality of optoelectric sensors, each sensor being movable in the direction perpendicular to the table. The sensors are designed to project light beams to the measuring points set forth on the wafer surface. The light beam reflected from each measuring point is detected by a detector there. To the detector is connected a photoelectric transducer which generates electric signals corresponding to the distance of each measuring point from a reference surface, so that thickness variations can be found. In a preferred embodiment, the sensors are arranged in linear rows at regular intervals and the wafer surface is scanned with the light beams so that all measuring points distributed lattice-wise at regular intervals on the wafer surface are covered. The thickness variations of the wafer may be put in a computer which is connected to the measuring apparatus.

4 Claims, 9 Drawing Figures

OPTOELECTRIC MULTI-SENSOR MEASURING APPARATUS AND A METHOD FOR MEASURING SURFACE FLATNESS THEREWITH

BACKGROUND OF THE INVENTION

In the electronics industry, thin-sliced wafers, such as wafers of high-purity semiconductors of silicon or germanium single crystals, are very important materials for the manufacture of various kinds of electronic elements, such as transistors, integrated circuits, oscillators, and the like. It is highly desirable in such wafer materials that the thickness, thickness variation, bowing of the wafers as well as the flatness of the wafer surface are strictly controlled with high precision.

In a conventional method, for example, as disclosed in Japanese Industrial Standard, H 0611-1971 "Methods of Measurement of Thickness, Taper and Bow for Silicon Wafers", the thickness or thickness variation of a wafer is determined by measuring thicknesses at several measuring points on the point-by-point basis. The thickness variation is usually expressed by the difference between the maximum value and the minimum value of thickness measured at 5 or more measuring points, which consist of the center point and points distributed in raidal symmetry around the center point and spaced several millimeters from the periphery of the wafer.

The point-by-point basis measurement is conventionally carried out by use of a plunger-type dial gauge, in which a wafer to be measured is mounted on an anvil and the surface of the wafer is contacted directly with the point of the probe of the dial gauge. Such direct contacting method is undesirable because the surface of the wafer eventually, though very sightly, becomes injured or contaminated by the direct contact of the probe point.

In order to avoid the above disadvantage encountered in the direct contacting method for the thickness measurement of a wafer, a non-contacting apparatus has recently been proposed (see U.S. Pat. No. 3,491,240), according to which, as the principle of measurement, a light beam is projected to a measuring point on the surface of the wafer, the reflected light beam is detected by a detector, and the intensity of the reflected light beam is converted to electric signals corresponding to the thickness of the wafer at the measuring point.

When the thickness variation of a wafer is to be determined, using either the contacting type or non-contacting type of apparatus, the thickness of the wafer is determined at several measuring points on the point-by-point basis, and the difference between the maximum and minimum values of the measured thicknesses is taken as the thickness variation. In this conventional measuring procedure, it is naturally required that the wafer should be moved horizontally to have all the predetermined measuring points, one by one, come exactly under the point of the fixed probe or light beam projector so that all of the measuring points can be measured for their thicknesses by a single probe or projector.

The handling of the wafer in the above movement is usually carried out by use of a sort of vacuum sucker, and yet there is the unavoidable danger that the surface of the wafer is scratched or contaminated as a result of contact with the vacuum sucker and the probe or projector and consequently in some cares the wafer itself becomes broken.

Further, the measuring operator is required to judge whether or not each wafer so examined has come up to the predetermined specifications promptly on the spot by comparing the maximum value and the minimum value of thickness measured point by point or the difference between those values and the predetermined standard values which the operator has committed to memory for each of the wafers. A manual operation of this nature is of course very laborious, and is apt to lead to serious errors in the work of wafer inspection even when the number of measuring points for each wafer is relatively small, say 5 or so.

The flatness of the surface of the semiconductor wafer has been required to be more and more critically perfect with the development of the electronics technology using silicon-made semiconductor wafers having a larger and larger diameter. In order to guarantee a very high precision for the surface flatness of polished silicon semiconductor wafers useful for integral circuits, the measurement of thicknesses at 5 or so measuring points may be insufficient, but the measurement conducted at measuring points distributed lattice-wise at small intervals throughout the surface of the wafer will be sufficient. For example, the thickness of a silicon wafer 3- to 5-inches in diameter may be measured at measuring points distributed lattice-wise on the surface longitudinally and laterally at regular intervals of one-fourth inch, the number of the measuring points per wafer being 100 to 200 or more.

It is almost a routine practice that the data of the above multi-point measurement of thickness, or rather the differences of the heights of the individual measuring points from a reference surface, which latter is determined with at least three measuring points, are used for the calculation of the value of non-linear thickness variation (NTV). NTV may be defined as the difference between the maximum height and the minimum height of the measuring points relative the reference surface. Such a multi-point measurement is practically impossible with the conventional point-by-point basis measuring apparatus which is not suitable for treating a large number of wafers.

SUMMARY OF THE INVENTION

It is therefore an object of the present invention to provide a non-contacting optoelectric measuring apparatus for the determination of the thickness or surface flatness of wafers which are free from the above-described disadvantages encountered by the prior art apparatuses.

Another object of the present invention is to provide a very efficient method for the determination of the values of NTV by use of the above measuring apparatus.

The measuring apparatus of the present invention comprises a table for mounting a wafer to be measured thereon and a plurality of optoelectric sensor means, the table and the sensor means being movable relatively in the direction perpendicular to the surface of the table to adjust the distance between the table and the sensor means, each sensor means comprising a light beam projector for projecting light beam to a measuring point set on the surface of the wafer mounted on the table, a detector for detecting the light beam reflected from the measuring point, and a photoelectric transducer connected to the detector for generating electric signals corresponding to the distance of the measuring point surface from the reference surface. With this arrangement of the sensor means, the multi-point measurement of thicknesses at the measuring points equal to the sensor means in number can be performed at one time.

The determination of the NTV values is conducted with the above measuring apparatus having a plurality of sensor means by scanning the surface of the wafer to cover all of the measuring points distributed on the wafer surface.

In a preferred embodiment, the determination of the NTV value is conducted with the sensor means arranged linearly in a row at regular intervals by scanning the surface of the wafer with this assembly of the sensor means to cover all of the measuring points distributed lattice-wise on the surface, measuring the distances of the individual measuring points from the reference surface, and subjecting the data thus obtained to computerized calculation.

BRIEF DESCRIPTION OF THE DRAWINGS

In the drawings:

FIG. 2b, 2c, and 2d are schematic views showing the distribution of the light beams, on two p.e. elements of the detector, by the optical system shown in FIG. 2a.

DETAILED DESCRIPTION OF THE PREFERRED EMBODIMENTS

The principle of measurement using the sensor means according to the present invention will be explained with reference to FIGS. 2a to 2d.

Figure 2A:
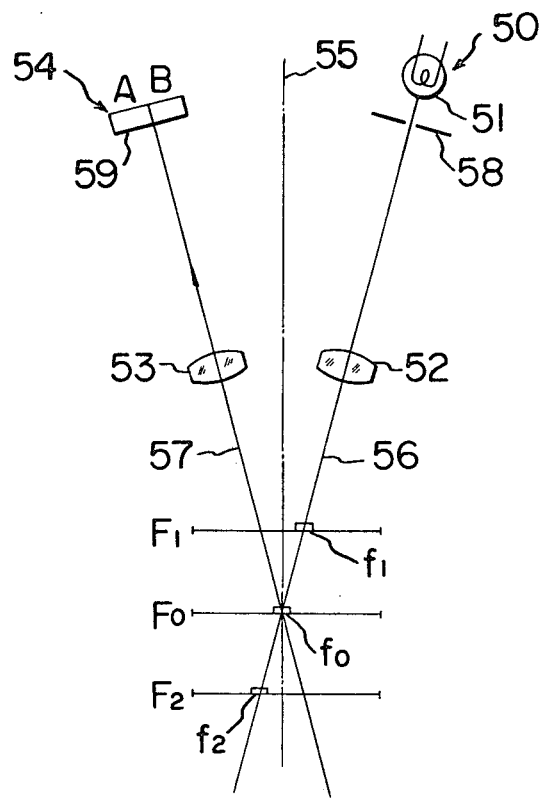
FIG. 2a is a schematic diagram showing the optical system of the sensor means employed in the measuring apparatus of this invention.
Figure 2B:
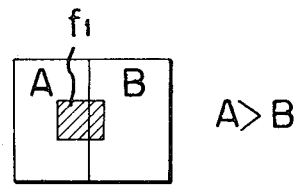
Figure 2C:
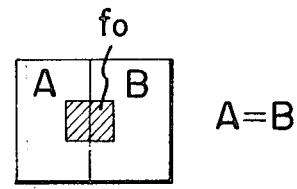
Figure 2D:
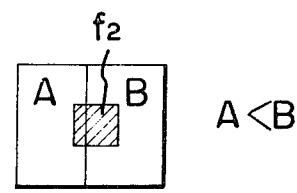

In FIG. 2a, a projector 50 with a lamp 51 projects light beam 56 through a slit 58 and a lens 52 to form an image $f_0$ of slit 58 on a reference surface $F_0$, where reflected light beam 57 is passed through a lens 53 to a light-receiving surface 59 of a detector 54 which is positioned symmetrically with light projector 50 relative to the normal 55 of the light-reflecting surface. The light-receiving surface 59 of the detector 54 consists of two photoelectric elements A and B. When the measuring point on the light-reflecting surface is positioned at the same height as the reference surface $F_0$, the image $f_0$ of slit 58 reflected onto the light-receiving surface 59 of the detector 54 is divided exactly equally between two photoelectric elements A and B, whereby the electric signals generated in the photo-electric elements A and B are balanced, as shown in FIG. 2c. On the contrary, if the measuring point on the light-reflecting surface is positioned at a higher level $F_1$ or a lower level $F_2$, the image $f_1$ or $f_2$ of slit 58 produced on light-receiving surface 59 is a little to the left or right, respectively, as shown in FIGS. 2b and 2d, indicating that the electric signals generated in photoelectric elements A and B are unbalanced. This unbalance of the electric signals is related directly to the difference in the height of the measuring point from the reference surface, and is readily converted to and indicates the height of the measuring point.

Figure 3:
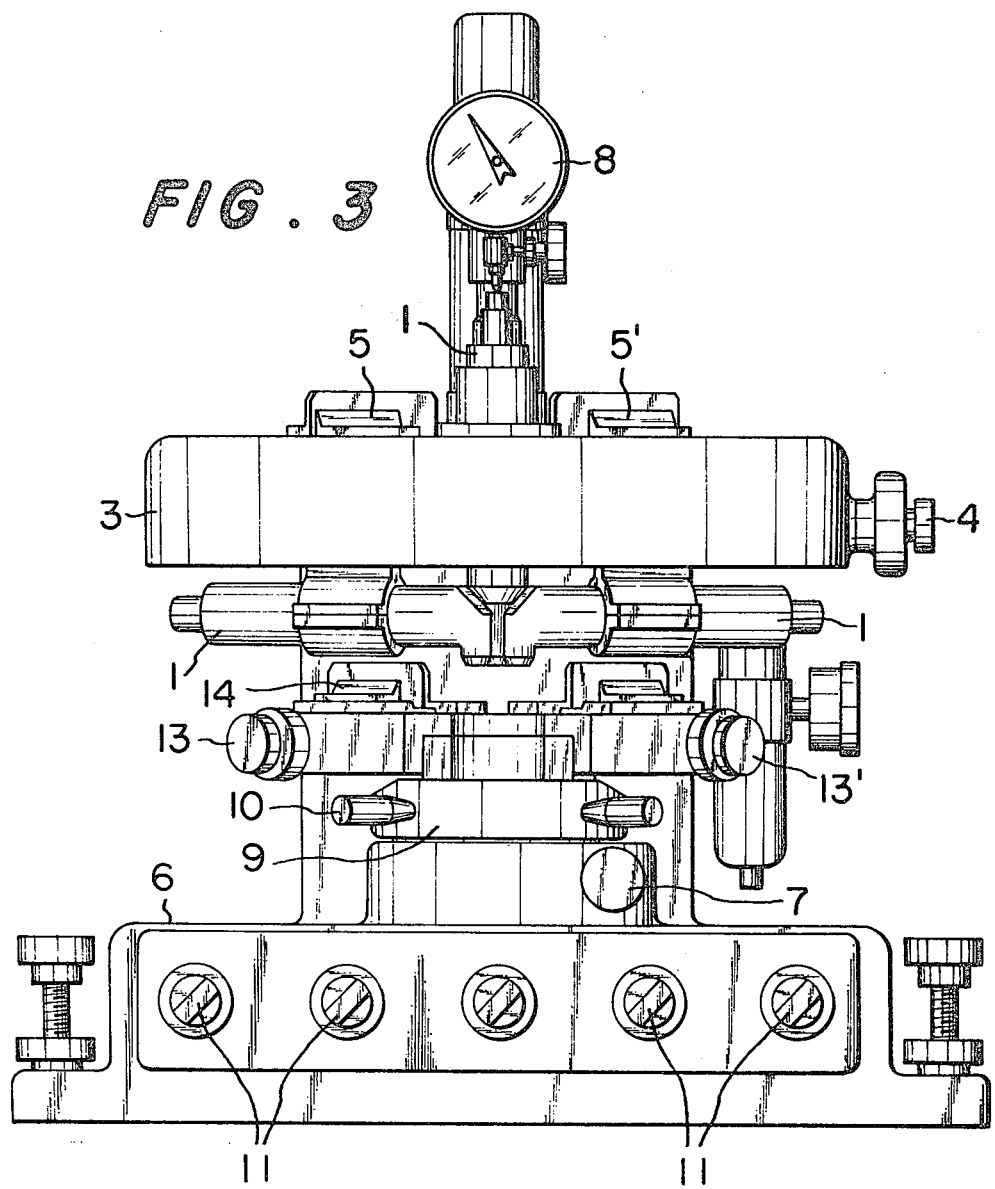
FIG. 3 is a front view of the apparatus according to the invention.
Figure 4:
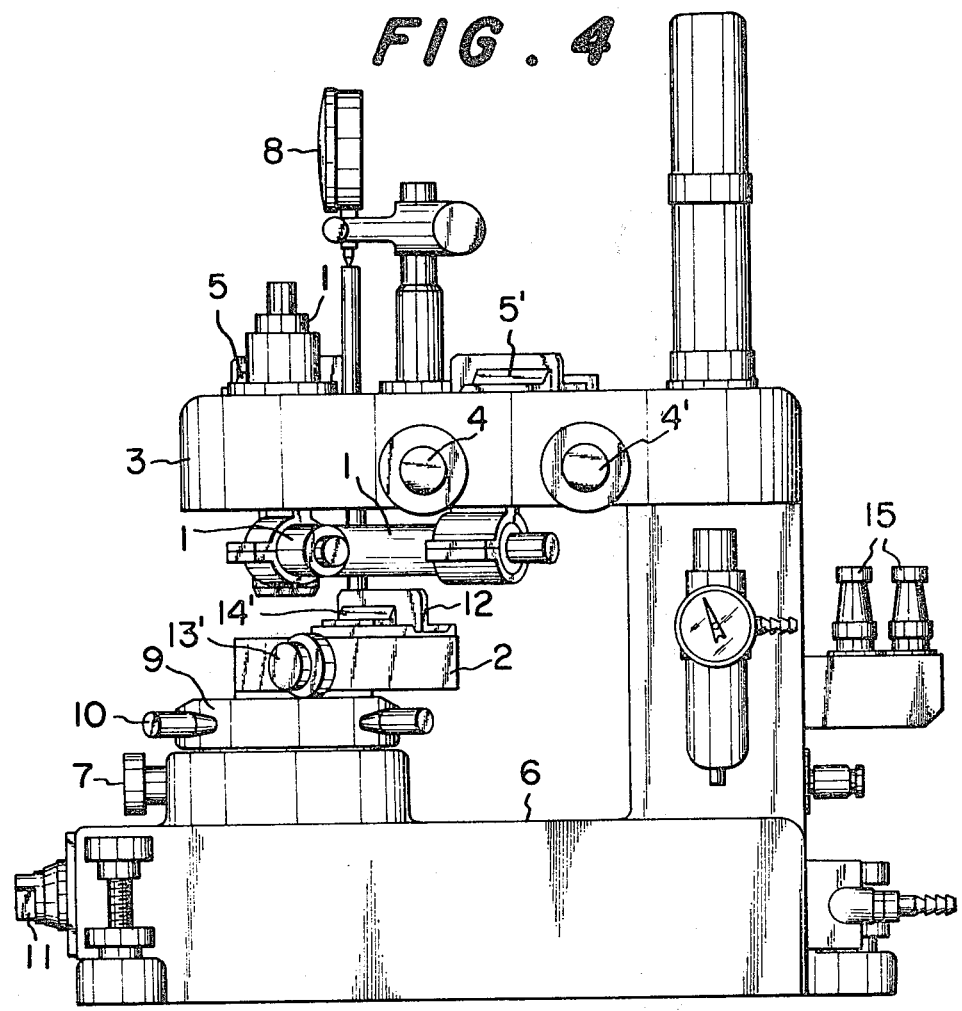
FIG. 4 is the right side view of the apparatus in FIG. 3.

Referring now to FIGS. 3 and 4 showing the front view and the right side view of the apparatus, respectively, the apparatus has, as the principal components, five sensors 1 and a table 2 for mounting a testing wafer W.

In general, the optoelectric sensors, each composed of a light beam projector and a detector for detecting the reflected light beam with a photoelectric transducer, are designed to have a rod-like shape with the axis of the rod parallel with the optical axis of the system. The diameter of such a rod-shaped optoelectric sensor, however, cannot be sufficiently small to enable the assembly of the sensors to be so small that the individual sensors are directly above the measuring points on the testing wafer surface, with each of the sensors having the optical axes normal to the surface.

In order to avoid this difficulty, the sensors are positioned horizontally and the optical axis of each of the sensors is deflected, for example, at right angle with a prism so as that the light beam is projected perpendicularly at the measuring point on the wafer surface. The sensors 1, held radially under a holder 3 except for the central sensor are movable in the radial directions by turning adjuster knobs 4, 4', through the built-in mechanism in the holder 3 so that the light beams from the sensors are projected exactly onto the measuring points on wafers with different diameters. The positions of the individual sensors 1 are read on indicators 5 and 5'.

The table 2 for mounting the wafer on a base 6 of the apparatus is also movable up and down by turning an adjustment knob 7, via the linking mechanism built-in under the table 2. The height of the table 2 is indicated by a dial gauge 8. The wafer-mounting table 2 is, after adjustment of its height, fastened fixedly by turning a lever 10 of a clamp 9. Though not shown in the figures, the table 2 is provided with a number of small vacuum holes in its surface, which are activated to fixedly adhere the testing wafer to the table surface by use of a vacuum pump, and are controlled by valves 11. The valves 11 are operated selectively in accordance with the diameter of the testing wafer.

The wafer-mounting table 2 has a guide member 12 on its surface for fixing the wafer in a definite position. This guide member 12 is moved to and fro in the radial direction by adjustment knobs 13, 13; through the mechanism built in the table 2 and the position of the guide member 12 is read on the indicators 14 and 14' in relation to the diameter of the testing wafer.

Figure 1:
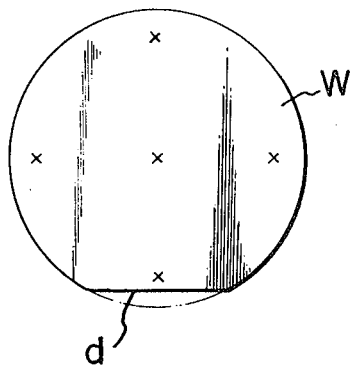
FIG. 1 is a schematic view of a wafer showing several measuring points and an orientation flat.

The apparatus is equipped with pairs of the sensor-positioning knobs 4 and 4', the corresponding indicators 5 and 5', the wafer-positioning knobs 13 and 13', and the corresponding indicators 14 and 14'. This is with the object that a set of the knobs 4' and 13' and the indicators 5' and 14' serves for the measurement of the measuring point at the orientation flat d as shown in FIG. 1, while the other set of the knobs 4, 13 and the indicators 5, 14 serves for the measurement of the other measuring points except the center point.

The light beams projected simultaneously from the set of the light beam projectors in the sensors 1 are reflected at the individual measuring points on the wafer and detected by the detectors in the sensors 1 and converted by the transducers in the sensors to a set of electric signals corresponding to the thickness of the wafer at the individual measuring points or rather the distances of the individual measuring points from a reference surface. The set of the electric signals coming from output terminals 15 is introduced through an electric cable to a data processing circuit, where the signals are processed into data enabling the circuit to judge whether or not the wafer is up to the predetermined specifications.

Figure 5:
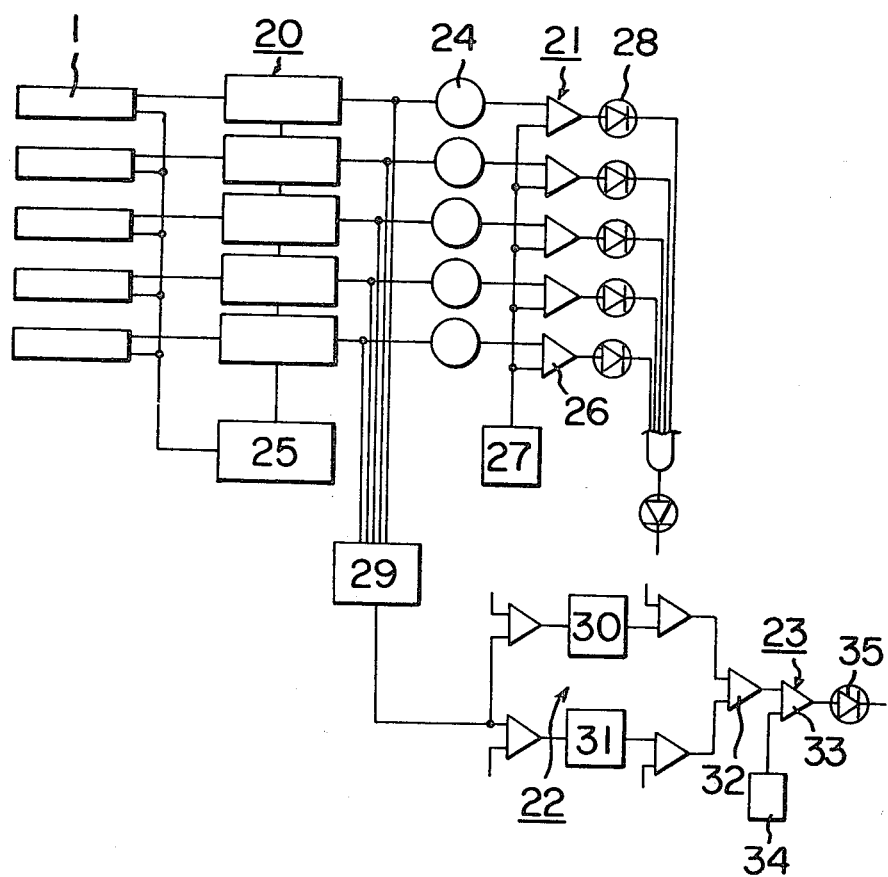
FIG. 5 is a schematic block diagram showing the data processing circuit according to this invention.

The block diagram of the data processing circuit is illustrated in FIG. 5. It is composed of output circuit 20 for generating output signals, corresponding to the input signals from the set of the sensors, corresponding to the thickness of the wafer at the measuring points, comparator circuit 21 judging the thickness testing by the comparison of the output signals from the circuit 20, corresponding to the thickness of the wafer, with the reference signals suitably set corresponding to the predetermined permissible differences of the thickness from the standard values, a detector circuit 22 for giving an output signal corresponding to the thickness variation by comparing the maximum value and the minimum value among the output signals from the circuit 20, and a circuit 23 for giving judgement data with respect to the thickness variation by comparing the output signals from the circuit 22 with the reference signal suitably set corresponding to the permissible difference from the predetermined standard value.

The function of each of the electric circuits 20 to 23 will be explained in the following.

The output circuit 20 has a function that the electric signals coming from the sensors 1 corresponding to the thickness of the wafer at the measuring points are modulated so as to be supplied to the comparator circuit 21 and the variation detecting circuit 22 following the circuit 20. The output signals from the output circuit 20 are read, if desired, on meters 24. Each of the sensors 1 is driven by a driving circuit 25.

The comparator circuit 21 is composed of comparators 26, in which comparison is carried out between the output signals from the output circuit 20 and reference signals or electric measuring signal supplied from a comparison level 27 corresponding to the predetermined permissible difference in the thickness of wafers so that a judgement signal is generated to indicate whether or not the signals from the output circuit 20 are within the permissible difference. The results of this judgement are displayed on the indicator lamps of green and red corresponding to the test results of "good" and "no good", respectively.

The detector circuit 22 for thickness variation works to supply the signals from each circuit of the output circuit 20 to a multiplexer 29, and the output signals from this multiplexer 29 are then supplied to a circuit 32 through a maximum value detector circuit 30 and a minimum value detector circuit 31. The circuit 32 produces an output signal or measuring signal for the difference between the output levels of the circuits 30 and 31 corresponding to the difference between the maximum and minimum values of the thickness of the wafer under measurement at the measuring points. The output signal from the circuit 32 is compared in the comparator circuit 23, composed of a comparator, with the reference signal coming from the second comparison level 34 corrresponding to the predetermined permissible range of the variation in the wafer thickness. The results of judgement whether the signals from the circuit 32 are within the permissible range or not are displayed on the indicator lamps 35 of green and red corresponding to the test results of "good " and "no good", respectively.

The data obtained in the circuits and indicated on the meters 24 as well as the results of judgement in the comparator circuits 21 and 23 are optionally introduced into a computer connected to the apparatus and recorded automatically whereby the treatment of the results of measurement and the work of wafer inspection can be performed more speedily.

As has been described in the foregoing, the simultaneous multi-point measurement of wafer thickness is readily performed by the measuring apparatus of the present invention. Important advantages obtained include (1) much saving of the time for the measurement of wafer thickness, since the thickness can be measured simultaneously at a number of measuring points as required for the inspection, (2) elimination of the problems in handling in the prior art method when the wafer to be measured should be moved on the wafer-mounting table point by point, and (3) automatical and reliable judgement of the thickness as well as thickness variation without any chance of error by operators.

Further it should be emphasized that recent development in the semi-conductor technology and electronics is requiring that the thickness or surface flatness of a semiconductor wafer having a large diameter should be measured throughout the whole area of the wafer surface by setting many measuring points to be distributed, for example, lattice-wise on the wafer surface. For example, it is desired that the surface flatness of a 3- to 5-inch diameter silicon wafer be determined at all of the measuring points distributed throughout on the wafer surface lattice-wise longitudinally and laterally at regular one-fourth inch intervals, so that the number of the measuring points amounts to as many as 100 to 200 or more.

The radial arrangement of the optoelectric sensors in the measuring apparatus of the present invention is not suitable for such a lattice-wise multi-point measurement, when it is intended to carry out the measurement simultaneously, because of an excessively large number of the sensors required. In such a case, the surface of the wafer is scanned with the assembly of the sensor means so that all of the measuring points distributed on the surface are covered by the sensor means, whereby measurements can be carried out at all the measuring points. For a preferred arrangement of the sensor means, the measuring apparatus of the present invention is designed so as to arrange the optoelectric sensors linearly in a row at regular intervals to match the arrangement of the measuring points of the wafer surface. With this arrangement of the sensors, the surface of the wafter is scanned from one end to the other so that the measurement using the sensors may cover all of the measuring points distributed throughout on the surface lattice-wise or longitudinally and laterally at regular intervals, the intervals being the same as those between the sensors arranged in a row.

Figure 6:
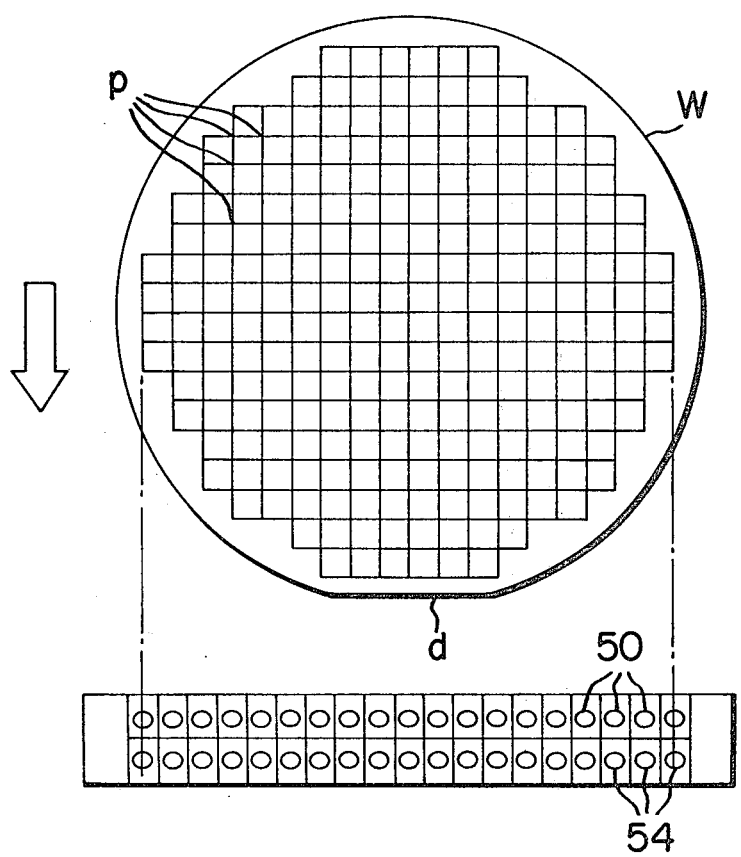
FIG. 6 schematically illustrates the lattice-wise distribution of measuring points and corresponding optoelectric sensors.

Referring to FIG. 6, this shows schematically the arrangement of a set of light projectors 50 and detectors 54 and the distribution of the measuring points P on the surface of a wafer W with the orientation flat d mounted on the table. Scanning of the wafer surface with the sensors is carried out by advancing the table with the wafer in the direction of the arrow so that all the measuring points are covered.

The value of the non-linear thickness variation (NTV) as a measure of the surface flatness of the wafer is calculated by comparing the height of each of the measuring points with the reference surface. The way for setting the reference surface is arbitrary and, in some cases, a surface plate mounted on the same table as the wafer serves as the reference surface. A more convenient way for setting the reference surface is, however, to use the distance or height values themselves of three of the measuring points as measured by the measuring apparatus. Three electric reference signals are generated by three light beams selected from the plurality of light beams. With the height values of three measuring points, not on the same straight line, determined with the apparatus, a plane can be defined involving these three points, and this plane is used as the reference surface. The distances of the rest of the measuring points from this reference surface are readily determined by computerized calculation and the difference between the largest distance and the smallest distance thus calculated is taken as the NTV value. Alternatively, the reference surface can be defined by setting a plane with the height as determined by the method of least square for height values of at least four of the measuring points, and the value of NTV is obtained in the same manner as above. These calculations for setting the reference surface and for calculating the NTV value are a matter of rather easy access for a computer and can be performed very rapidly and efficiently to make a satisfactory routine inspectional work of the wafers.

What is claimed is:

1. A method for the determination of a value of nonlinear thickness variation of a wafer, said method comprising the steps of providing a table for mounting the wafer, providing a plurality of optoelectrical sensor means, with the table and the sensor means being relatively movable in a direction perpendicular to the wafer mounting surface of the table, projecting a respective light beam from each sensor means to a respective measuring point set on the surface of the wafer mounted on the table, utilizing the projected light beams to simultaneously scan all the measuring points distributed on the surface of the wafer, separately detecting the respective light beams reflected from the measuring points, utilizing only three spaced light beams which are not distributed in a line to generate electric reference signals respectively corresponding to three distances of three measuring points on the surface of the wafer to define a reference plane, utilizing the light beams to generate electric measuring signals respectively corresponding to the distance of each measuring point from the reference surface, and utilizing the generated electric signals as a measure of the respective distances of the individual measuring points from the reference surface.

2. A method for the determination of a value of nonlinear thickness variation of a wafer, said method comprising the steps of providing a table for mounting the wafer, providing a plurality of optoelectrical sensor means, with the table and the sensor means being relatively movable in a direction perpendicular to the wafer mounting surface of the table, projecting a respective light beam from each sensor means to a respective measuring point set on the surface of the wafer mounted on the table, utilizing the projected light beams to simultaneously scan all the measuring points distributed on the surface of the wafer, separately detecting the respective light beams reflected from the measuring points, utilizing at least four spaced light beams to generate at least four electric reference signals respectively corresponding to the distances of four measuring points on the surface of the wafer and using the method of least square for the values of the distances of the four measuring points to define a reference surface, utilizing the light beams to generate electric measuring signals respectively corresponding to the distance of each measuring point from the reference surface, and utilizing the generated electric signals as a measure of the respective distances of the individual measuring points from the reference surface.

3. A method for the determination of a value of nonlinear thickness variation of a wafer, said method comprising the steps of providing a table for mounting the wafer, providing a plurality of optoelectrical sensor means arranged linearly in a row at regular intervals, with the table and the sensor means being relatively movable in a direction perpendicular to the wafer mounting surface of the table, projecting a respective light beam from each sensor means to a respective one of a plurality of measuring points distributed latticewise on the surface of the wafer at regular intervals equal to the intervals between said sensor means, utilizing the light beams to progressively scan the measuring points on the surface of the wafer, separately detecting the respective light beams reflected from the measuring points, utilizing only three spaced light beams which are not distributed in a line to generate electric reference signals respectively corresponding to three distances of three measuring points on the surface of the wafer to define a reference plane, utilizing the reflected light beams to generate electric measuring signals respectively corresponding to the distance of each measuring point from the reference surface, and utilizng the generated electric measuring signals as a measure of the distance of the respective measuring points from the reference surface.

4. A method for the determination of a value of nonlinear thickness variation of a wafer, said method comprising the steps of providing a table for mounting the wafer, providing a plurality of optoelectrical sensor means arranged linearly in a row at regular intervals, with the table and the sensor means being relatively movable in a direction perpendicular to the wafer mounting surface of the table, projecting a respective light beam from each sensor means to a respective one of a plurality of measuring points distributed latticewise on the surface of the wafer at regular intervals equal to the intervals between said sensor means, utilizing the light beams to progressively scan the measuring points on the surface of the wafer, separately detecting the respective light beams reflected from the measuring points, utilizing at least four spaced light beams to generate at least four electric measuring signals respectively corresponding to at least four distances of four measuring points on the surface of the wafer and determining by the method of least square for the values of the at least four distances of the at least four measuring points to find a reference plane, utilizing the reflected light beams to generate electric measuring signals respectively corresponding to the distance of each measuring point from the reference surface, and utilizing the generated electric means signals as a measure of the distance of the respective measuring points from the reference surface.

* * * * *